United States Patent
Waseda et al.

(10) Patent No.: US 10,941,851 B2
(45) Date of Patent: Mar. 9, 2021

(54) DRAWN PLANETARY PIN ASSEMBLY

(71) Applicant: Koyo Bearings North America LLC, Greenville, SC (US)

(72) Inventors: Yoshitaka Waseda, Aichi (JP); Cole A. Hume, Simpsonville, SC (US); Joseph C. Woods, Jr., Waterloo, SC (US); Giovanni DiMatteo, Plymouth, MI (US)

(73) Assignee: Koyo Bearings North America LLC, Greenville, SC (US)

( * ) Notice: Subject to any disclaimer, the term of this patent is extended or adjusted under 35 U.S.C. 154(b) by 142 days.

(21) Appl. No.: 16/068,416

(22) PCT Filed: Jan. 6, 2017

(86) PCT No.: PCT/US2017/012463
§ 371 (c)(1),
(2) Date: Jul. 6, 2018

(87) PCT Pub. No.: WO2017/120427
PCT Pub. Date: Jul. 13, 2017

(65) Prior Publication Data
US 2019/0017589 A1     Jan. 17, 2019

Related U.S. Application Data

(60) Provisional application No. 62/275,529, filed on Jan. 6, 2016.

(51) Int. Cl.
*F16H 57/08*     (2006.01)
*B21C 23/08*     (2006.01)
(Continued)

(52) U.S. Cl.
CPC ............. *F16H 57/08* (2013.01); *B21C 23/08* (2013.01); *F16H 57/029* (2013.01);
(Continued)

(58) Field of Classification Search
None
See application file for complete search history.

(56) References Cited

U.S. PATENT DOCUMENTS 1,993,732 A     3/1935    Bijur
2,274,276 A     2/1942    Rappl
(Continued)

FOREIGN PATENT DOCUMENTS

JP     2007 170566 A     7/2007
JP     20070170566     7/2007
(Continued)

OTHER PUBLICATIONS

International Search Report and Written Opinion for Co-pending PCT application No. PCT/US2017/012463 dated Jun. 13, 2017.
(Continued)

*Primary Examiner* — Colby M Hansen
(74) *Attorney, Agent, or Firm* — Nelson Mullins Riley & Scarborough LLP

(57) ABSTRACT

A pin assembly for use in a planetary gear including a pin including a cylindrical side wall defining a central bore that extends from a first end to a second end of the pin along its longitudinal center axis, an inlet bore, and a first annular groove that extends radially outwardly into the side wall of the pin adjacent the first end. A first cylindrical plate includes a first side wall, a second side wall, and a cylindrical outer wall extending therebetween, the first plate being disposed within the first annular groove of the pin, wherein a width of the first plate in a direction parallel to the longitudinal center axis is less than a width of the first annular groove in the direction parallel to the longitudinal center axis so that the first plate is axially slidable within the first annular groove.

17 Claims, 5 Drawing Sheets

(51) Int. Cl.
*F16H 57/029* (2012.01)
*F16H 57/04* (2010.01)
*C21D 9/00* (2006.01)

(52) U.S. Cl.
CPC ....... *F16H 57/043* (2013.01); *F16H 57/0479* (2013.01); *F16H 57/0486* (2013.01); *F16H 57/082* (2013.01); *C21D 9/0075* (2013.01)

(56) References Cited

U.S. PATENT DOCUMENTS

| | | | |
|---|---|---|---|
| 3,511,114 A * | 5/1970 | Schnepel | B25B 17/02 475/270 |
| 3,550,616 A | 12/1970 | Graham et al. | |
| 3,556,123 A | 1/1971 | Smith | |
| 3,889,710 A | 6/1975 | Brost | |
| 4,286,628 A | 9/1981 | Paradis et al. | |
| 4,776,237 A * | 10/1988 | Premiski | F16C 33/6659 475/159 |
| 4,907,616 A | 3/1990 | Bergsma | |
| 5,494,422 A | 2/1996 | Ukai et al. | |
| 5,622,487 A | 4/1997 | Fukuhara et al. | |
| 6,227,830 B1 | 5/2001 | Fields et al. | |
| 6,712,591 B2 | 3/2004 | Lee | |
| 6,739,847 B1 | 5/2004 | Tarng et al. | |
| 6,848,893 B2 | 2/2005 | Tarng et al. | |
| 7,108,068 B2 | 9/2006 | Stevens et al. | |
| 8,328,543 B2 | 12/2012 | Wilson | |
| 2005/0252328 A1* | 11/2005 | Shattuck | F16C 13/006 74/431 |
| 2009/0190870 A1* | 7/2009 | Chen | F16C 19/48 384/420 |
| 2010/0120576 A1* | 5/2010 | Satou | F16H 57/08 475/348 |
| 2012/0083375 A1* | 4/2012 | Lo | B62M 6/65 475/149 |
| 2012/0177879 A1* | 7/2012 | Cripsey | B21H 5/025 428/134 |
| 2014/0080658 A1* | 3/2014 | Edelmann | F16H 57/08 475/331 |
| 2015/0247566 A1 | 9/2015 | McKinzie et al. | |

FOREIGN PATENT DOCUMENTS

| | | |
|---|---|---|
| JP | 2007 253190 A | 10/2007 |
| JP | 2008128286 | 6/2008 |
| JP | 2008-265958 A | 11/2008 |
| JP | 63-62968 B2 | 7/2018 |
| KR | 2014 0144727 A | 12/2014 |
| WO | 2013166149 | 11/2013 |

OTHER PUBLICATIONS

Office Action, Japanese Patent Application No. 2018-535134, dated Jul. 25, 2019, 7 pages.
Office Action, Korean Patent Application No. 10-2018-7022224, dated Jul. 1, 2019, 11 pages.
Office Action, with English language translation, for Korean Patent Application No. 10-2018-7022224, dated Jan. 23, 2020, 11 pages.
European Examination Report, European Application No. 17701618, dated May 7, 2019, 5 pages.

* cited by examiner

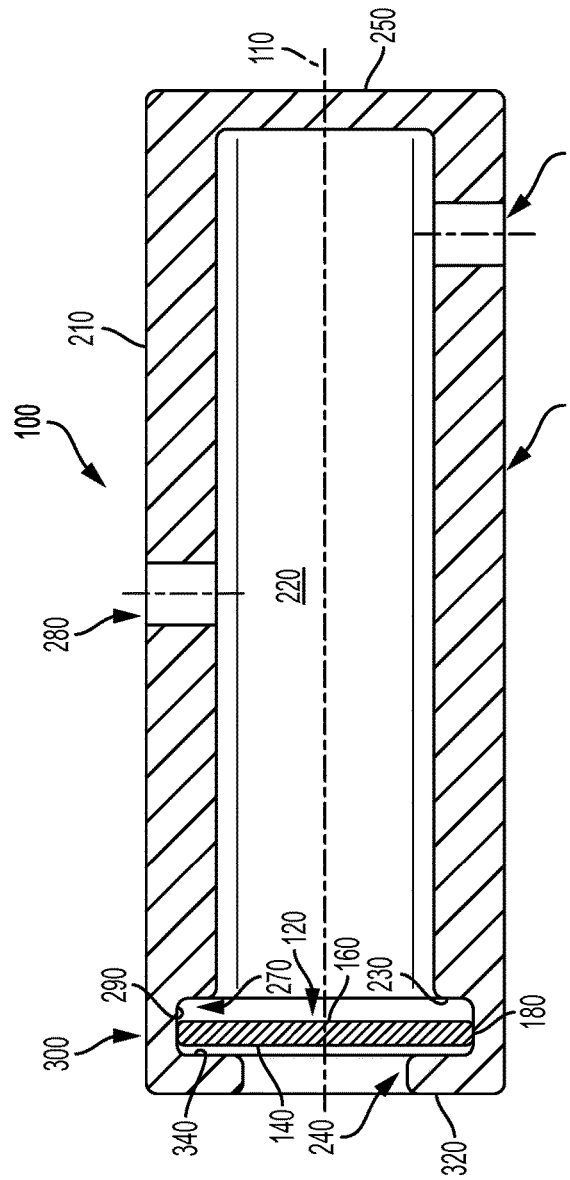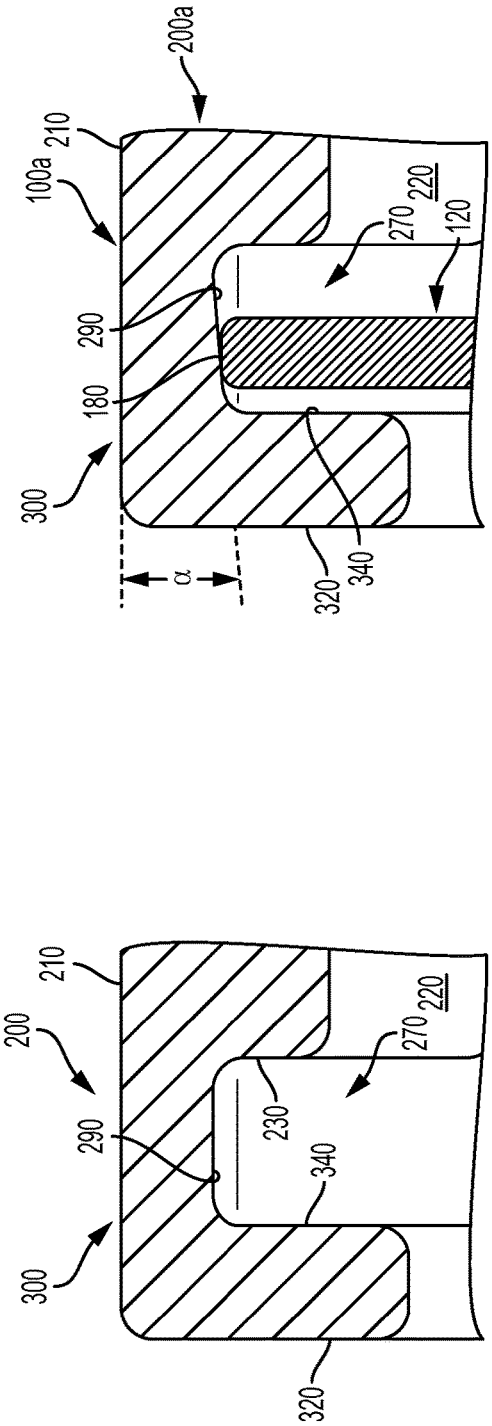

US 10,941,851 B2

DRAWN PLANETARY PIN ASSEMBLY

FIELD OF THE INVENTION

The present disclosure relates generally to planetary bearings. More particularly, the present disclosure is related to a plug for enhancing lubrication flow through a pin of a planetary bearing.

BACKGROUND

A typical concern with planetary bearings in transmissions is sufficient lubrication flow to the rolling elements of the planetary bearing. Lube dams on carriers, hollow pins, semi-hollow pins, cross drilled pins, ball/drawn plug pins, etc., are devices and methods that direct lubrication to the planetary bearing. Each of these designs has its own concerns, which can include high cost, additional customer assembly, pin deformation from pressed ball or drawn steel plug, risk of pressed plugs falling out, and debris/burrs from multiple complex machining operations that require special considerations (i.e., deburring and washing operations).

The present invention recognizes and addresses considerations of prior art constructions and methods.

SUMMARY

One embodiment in accordance with the present disclosure is a pin assembly for use in a planetary gear including a cylindrical side wall defining a central bore that extends from a first end to a second end of the pin along its longitudinal center axis, an inlet bore in fluid communication with the central bore, an outlet bore in fluid communication with the central bore, and a first annular groove that extends radially outwardly into the side wall of the pin adjacent the first end. A first cylindrical plate includes a first side wall, a second side wall, and a cylindrical outer wall extending therebetween, the first plate being disposed within the first annular groove of the pin. The width of the first plate in a direction parallel to the longitudinal center axis is less than a width of the first annular groove in the direction parallel to the longitudinal center axis so that the first plate is axially slidable within the first annular groove.

Another embodiment in accordance with the present disclosure is a pin assembly for use in a planetary gear including a pin having a cylindrical side wall defining a central bore that extends from a first end, which defines an opening, to a second end of the pin along its longitudinal center axis, an inlet bore in fluid communication with the central bore, an outlet bore in fluid communication with the central bore, a first annular groove that extends radially outwardly into the side wall of the pin adjacent the first end the first end of the pin, and a first cylindrical plate including a first side wall, a second side wall, and a cylindrical outer wall extending therebetween, wherein the first annular groove is disposed at the first end of the pin adjacent the opening, and the first plate is disposed in the first annular groove.

Another embodiment in accordance with the present disclosure is a method of producing a pin assembly for a bearing assembly for a planetary gear set, including the steps of drawing a hollow cylindrical pin from a piece of sheet stock steel, performing a forming step on the cylindrical pin, and performing a hardening step on the cylindrical pin.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 2 is a cross-sectional view of a planetary bearing pin assembly as shown in FIG. 1;

FIG. 3 is a partial, cross-sectional view of the planetary bearing pin assembly shown in FIG. 2;

FIG. 4 is a partial, cross-sectional view of an alternate embodiment of a planetary bearing pin assembly in accordance with the present disclosure;

Figure 1:
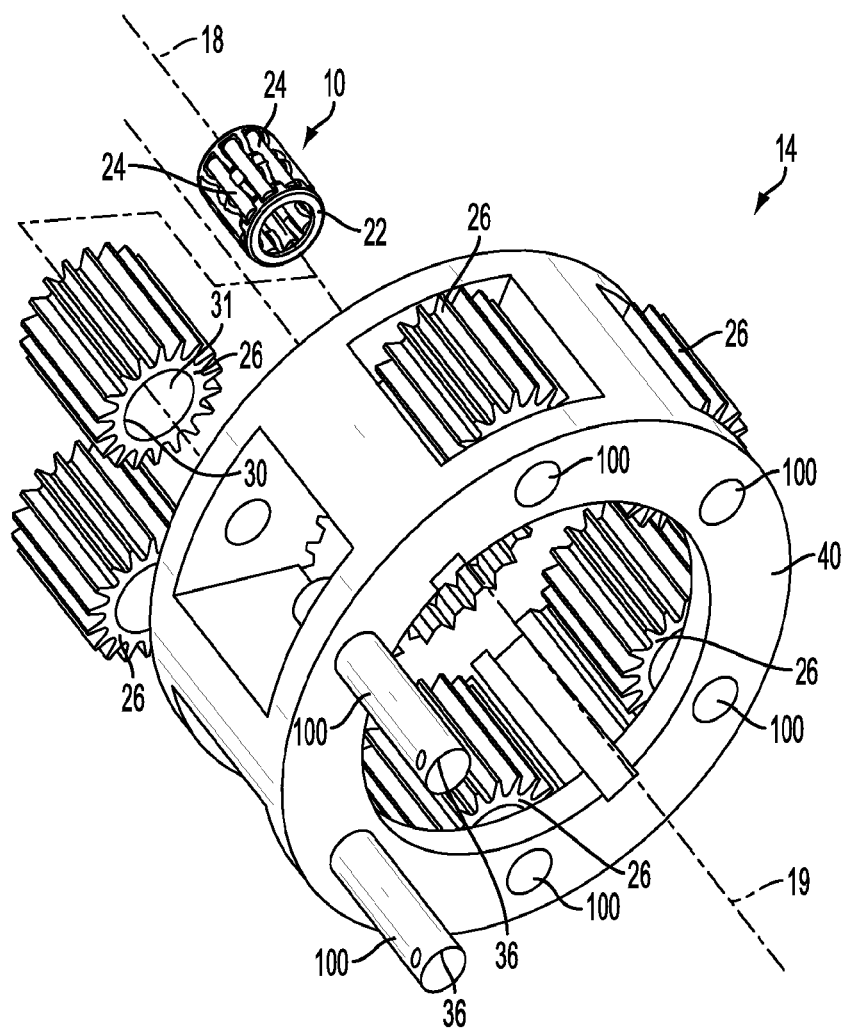
FIG. 1 is a perspective view of a planetary gear assembly including bearing pin assemblies in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, FIG. 1 illustrates a bearing assembly 10 for use in an automatic transmission planetary gear set 14. However, one skilled in the art will understand that bearing assembly 10 can also be used in other applications. Bearing assembly 10 includes a central axis 19, a bearing cage 22 coaxial with the central axis 18, and a plurality of rolling elements 24 (e.g., needle rollers) received by, and rotatable with respect to, bearing cage 22. In the illustrated embodiment, the planetary gear set 14 includes one or more planetary gears 26, each including a central bore 30 shaped to receive bearing assembly 10. Bearing assembly 10, in turn, receives a pin assembly 100, coaxial with the planetary gear 26 and central axis 18. Preferably, each pin assembly 100 is fixed at each end to carrier 40 of the planetary gear set by staking. Bearing assembly 10 permits relative rotation of planetary gear 26 with respect to pin assembly 100 while minimizing rotational friction therebetween. During normal operation, the plurality of rolling elements 24 contact both inner surface 31 of central bore 30 and outer surface 36 of pin assembly 100.

Referring additionally to FIG. 2, planetary pin assembly 100 includes a plate 120 (or plug) that enhances lubrication flow in a pin 200 (or shaft) that defines an inner raceway of a planet bearing. As shown, pin 200 includes a cylindrical side wall 210 which terminates in an end wall 250 to form a blind bore 220 that extends axially inward from an opening 240 formed in the end of pin 200 opposite end wall 250. Preferably, pin 200 is formed by a drawn cup of a material that is suitable for the intended use, such as, but not limited to, 1074 steel, 1524 steel, or like material. When drawing the cup to form pin 200, an axially extending annular flange 300 is formed adjacent opening 240, annular flange 300 being thinner in the radial direction with regard to a longitudinal center axis 110 of pin 200 than the cylindrical side wall portion 210 of the pin, as best seen in FIG. 3. Note, a radially-inwardly extending annular ledge 230 is formed at the intersection of the pin's side wall portion 210 and annular flange 300. An inlet bore 260 and an outlet bore 280 extend radially inward from the outer surface of the pin to blind bore 220.

Plate 120 is substantially disk-shaped and is defined by a pair of first and second side walls 160 and 180, respectively, and a cylindrical outer wall 180 extending therebetween. During assembly, plate 120 is slidably received in the portion of the pin's blind bore 220 that is formed by annular flange 300. Preferably, the diameter of plate 120 is slightly less than the inner diameter of annular flange portion 300 so that plate 120 is free to slide axially therein. As well, plate 120 may also be free to translate circumferentially about longitudinal center axis 110 within the annular groove. After plate 120 is positioned in blind bore 220, a distal portion 320 of annular flange portion 300 is bent radially-inwardly so that plate 120 is retained in annular groove 270 defined between annular ledge 230 and distal portion 320. Plate 120 can be formed from steel, polymers, rubber and elastomers. Optionally, a coating such as, but not limited to, polytetrafluoroethylene (PTFE), phosphate, silver, etc., may be provided on plate 120 to enhance sliding movement within annular groove 270.

During operation of pin assembly 100, oil is introduced into blind bore 220 of pin 200 through inlet bore 260. Initially, plate 120 may allow a limited amount of oil to leak by depending upon its position within annular groove 270. For example, when plate 120 is positioned in annular groove 270 as shown in FIG. 2, there will preferably be some oil that leaks past plate 120. However, as oil pressure builds within pin 200, plate 120 is urged axially outwardly until it abuts an inner surface 340 of the annular flange's distal portion 320, thereby forming a seal therewith and minimizing the amount of oil that bypasses plate 120. The oil is then free to exit pin 200 through outlet bore 280.

Referring now to FIG. 4, an alternate embodiment of a planetary pin assembly 100a is shown which includes a pin 200a with an annular groove 270 including an outer wall 290 which is frustoconical in shape. Outer wall 290 forms an angle (α) with the outer surface of the pin when viewing a cross-section of the pin that lies in a plane which passes through the pin's longitudinal center axis 110. As such, as plate 120 moves axially-outwardly due to increasing oil pressure, outer wall 180 of plate 120 forms a seal with outer wall 290 of annular groove 270 along its perimeter, rather than with the inner surface 340 of the annular flange's distal portion 340.

Figure 5:
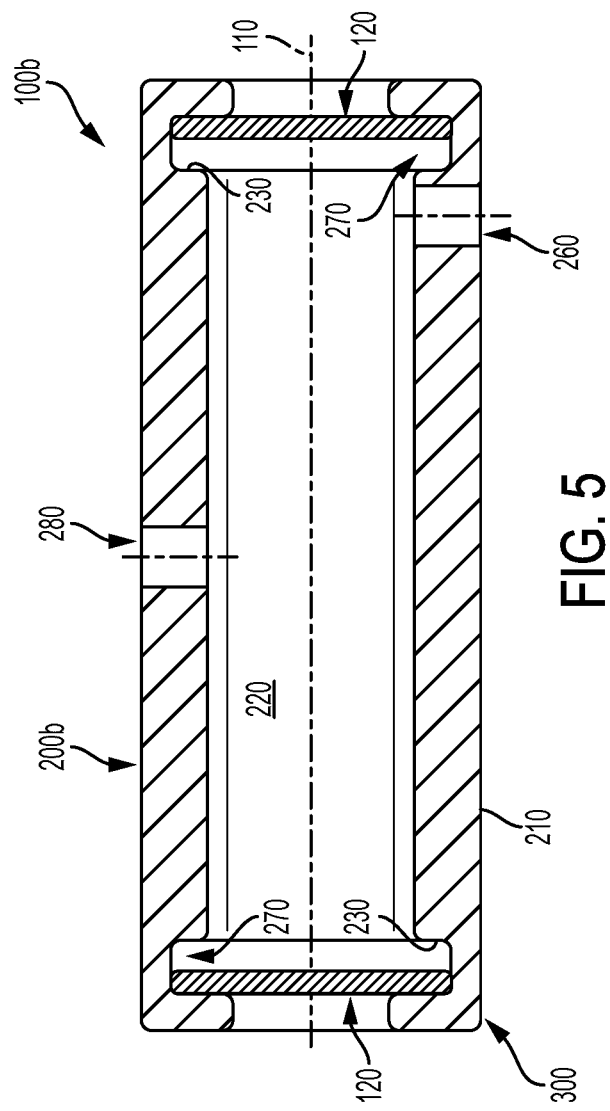
FIG. 5 is a cross-sectional view of an alternate embodiment of a planetary bearing pin assembly in accordance with the present disclosure.

Referring now to FIG. 5, an alternate embodiment of a planetary pin assembly 100b is shown. Planetary pin assembly 100b differs only for the embodiment shown in FIGS. 2 and 3 in that each end of pin 200b includes an annular groove 270 in which a plate 120 is received. During the drawing process to form pin 200b, rather than forming a cup with an end wall 250 (FIG. 2), the pin is drawn with two open ends.

Figure 6:
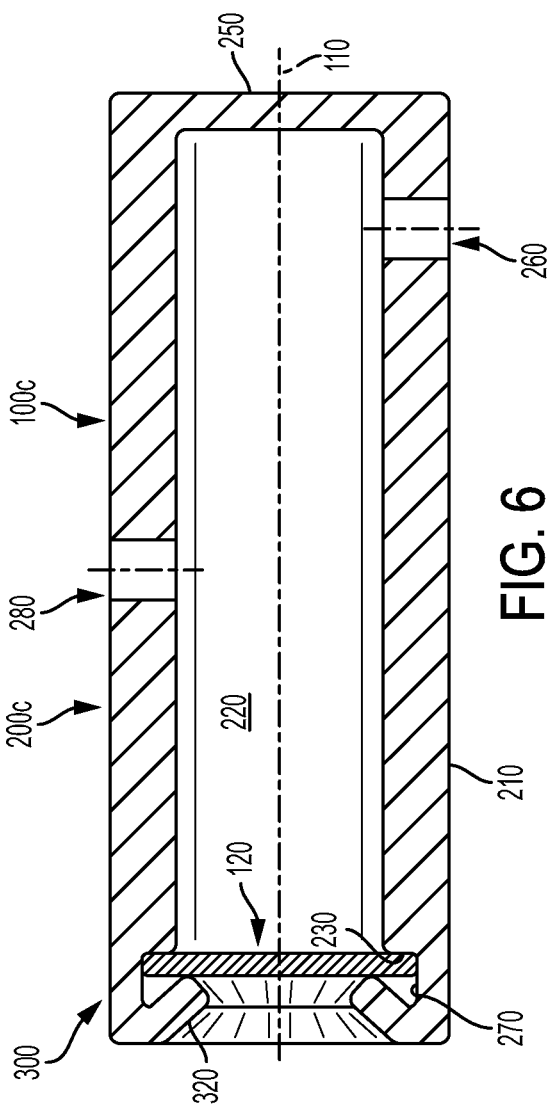
FIG. 6 is a cross-sectional view of an alternate embodiment of a planetary bearing pin assembly in accordance with the present disclosure.

As shown in FIG. 6, yet another alternate embodiment of a planetary pin assembly 100c includes a pin 200c in which plate 120 is not free to move within annular groove 270. Rather, distal portion 320 of annular flange 300 is crimped both radially and axially inwardly until plate 120 is urged against annular ledge 230 of pin 200c, forming a seal therewith.

Figure 7A:
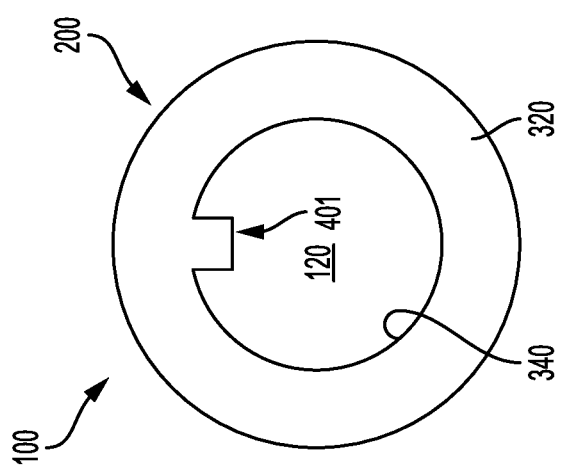
FIG. 7A through 7C are end views of embodiments of planetary bearing pin assemblies in accordance with the present disclosure.
Figure 7B:
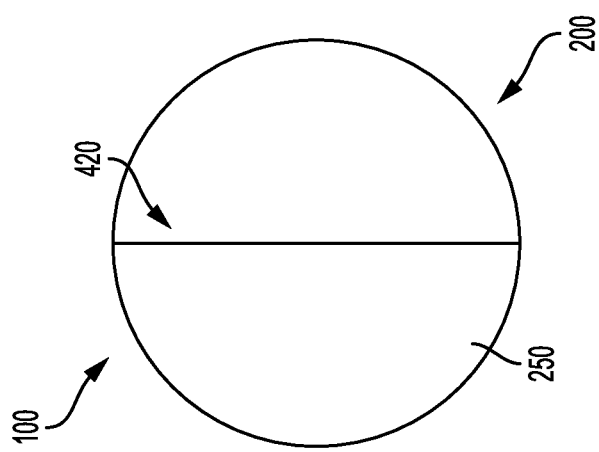
Figure 7C:
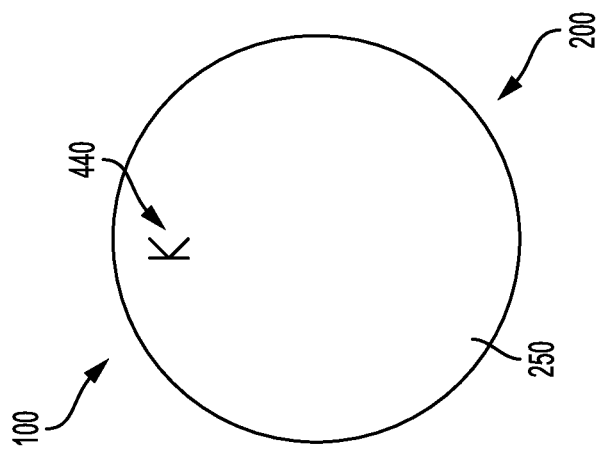

Referring now to FIGS. 7A through 7C, the planetary pin assembly 100 described above is shown with various lubricant inlet and outlet bore indicators. Specifically, as shown in FIG. 7A, a tab 401 is provided on distal portion 320 of the pin's annular flange portion that is aligned with outlet bore 280 (FIG. 2). Alternately, an indicator line 420 may be provided on end wall 250 of pin 200 that shows the alignment between inlet bore 260 and outlet bore 280. As well, as shown in FIG. 7C, an indicator mark 440 may be provided that indicates the position of outlet bore 280 on pin 200. These inlet/outlet indicators facilitate assembly of the planetary bearings in that they help insure each pin 200 is assembled with the desired alignment to facilitate lubricant flow therethrough.

Figure 8:
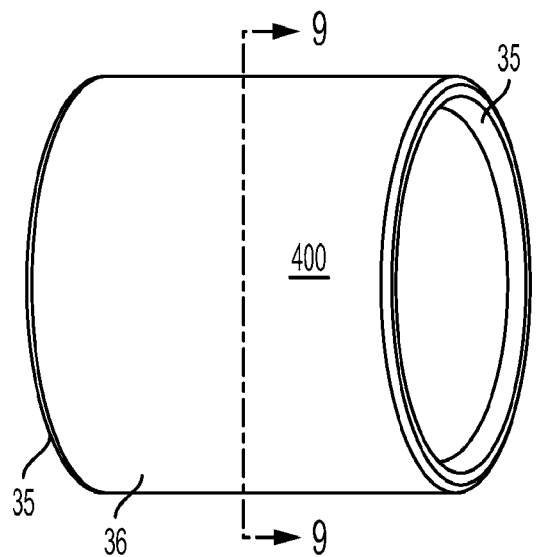
FIG. 8 is a perspective view of an alternate embodiment of a planetary bearing assembly in accordance with the present disclosure.
Figure 9:
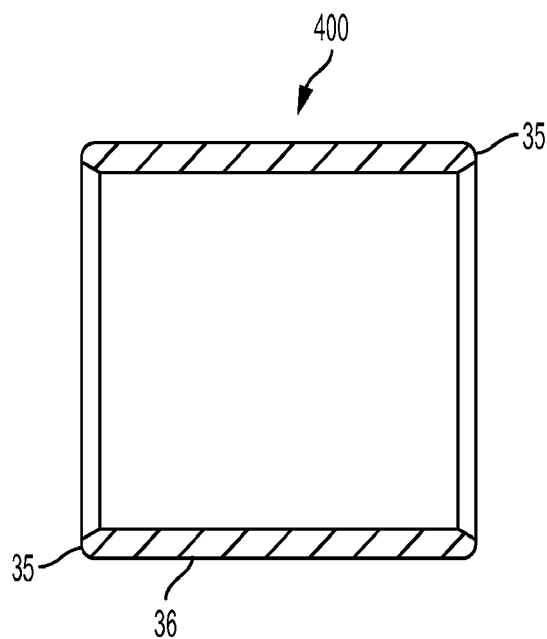
FIG. 9 is a cross-sectional view of the planetary bearing pin assembly shown in FIG. 8, taken along line 9-9.

Referring additionally to FIGS. 8 and 9, an alternate embodiment of a planetary pin 400 is preferably a hollow, drawn shaft. As shown, each pin 400 is drawn on a press from sheet stock, rather than being machined from bearing grade tube, bar or wire steel. Drawing on a press produces a "thin walled" large diameter (diameter greater than 25 mm) shaft. Preferably, the wall thickness of each gear axle is greater than 3 mm and the sheet stock is a hardenable bearing grade steel. After drawing, the sheet stock is processed in a forming press to achieve the final shape of each pin 400.

Next, each formed pin 400 is furnace thru-hardened, or carbonized to achieve a hardness greater than 60 HRC. Lips 402 disposed on opposing ends of each thru-hardened pin 400 then undergo a tempering process to reduce the hardness of lips 402 to less than 67 HRa. The tempering process facilitates the staking of each pin 400 to a carrier 40 (FIG. 1). Finally, each pin 400 is ground to meet the surface finish requirements of its proposed application, in accordance with existing standards.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed:

1. A pin assembly for use in a planetary gear, comprising:
   a pin including a cylindrical side wall defining a central bore that extends from a first end to a second end of the pin along its longitudinal center axis, an inlet bore in fluid communication with the central bore, an outlet bore in fluid communication with the central bore, and a first annular groove that extends radially outwardly into the side wall of the pin adjacent the first end; and a first disk-shaped cylindrical plate including a first side wall, a second side wall, and a cylindrical outer wall extending therebetween, the first plate being disposed within the first annular groove of the pin, wherein a width of the first plate in a direction parallel to the longitudinal center axis is less than a width of the first annular groove in the direction parallel to the longitudinal center axis so that the first plate is axially slidable within the first annular groove.

2. The pin assembly of claim 1, wherein the first annular groove of the pin is defined by a first annular surface, a second annular surface, and an outer surface extending therebetween, the first and the second annular surfaces each being transverse to the longitudinal center axis of the pin.

3. The pin assembly of claim 2, wherein the outer surface of the first annular groove of the pin is cylindrical.

4. The pin assembly of claim 2, wherein the outer surface of the first annular groove of the pin is frustoconical.

5. The pin assembly of claim 2, wherein the first side wall of the first plate abuts the first annular surface of the first annular groove of the pin so that a seal is formed therebetween when a fluid is introduced into central bore through inlet bore.

6. The pin assembly of claim 1, further comprising:
a second annular groove that extends radially outwardly into the side wall of the pin adjacent the second end of the pin; and a second disk-shaped cylindrical plate including a first side wall, a second side wall, and a cylindrical outer wall extending therebetween, wherein the second plate is disposed within the second annular groove of the pin and slidable axially within the second annular groove.

7. The pin assembly of claim 1, wherein the pin is a drawn cup having a bottom wall that is contiguous with the side wall of the pin at its second end.

8. The pin assembly of claim 1, wherein the inlet bore and the outlet bore both pass radially through the cylindrical side wall of the pin to that they are transverse to the longitudinal center axis.

9. The pin assembly of claim 1, wherein the first plate is rotatable within the first annular groove of the pin about the longitudinal center axis.

10. A pin assembly for use in a planetary gear, comprising:

a pin including a cylindrical side wall defining a central bore that extends from a first end, which defines an opening, to a second end of the pin along its longitudinal center axis, an inlet bore in fluid communication with the central bore, an outlet bore in fluid communication with the central bore, a first annular groove that extends radially outwardly into the side wall of the pin adjacent the first end the first end of the pin; and a first disk-shaped cylindrical plate including a first side wall, a second side wall, and a cylindrical outer wall extending therebetween, wherein the first annular groove is disposed at the first end of the pin adjacent the opening, and the first plate is disposed in the first annular groove.

11. The pin assembly of claim 10, wherein a width of the first plate in a direction parallel to the longitudinal center axis of the pin is less than a width of the first annular groove in the direction parallel to the longitudinal center axis of the pin so that the first plate is axially slidable within the first annular groove.

12. The pin assembly of claim 10, wherein the first annular groove of the pin is defined by a first annular surface, a second annular surface, and an outer surface extending therebetween, the first and the second annular surfaces each being transverse to the longitudinal center axis of the pin.

13. The pin assembly of claim 12, wherein the outer surface of the first annular groove of the pin is cylindrical.

14. The pin assembly of claim 12, wherein the outer surface of the first annular groove of the pin is frustoconical.

15. The pin assembly of claim 12, wherein the first side wall of the first plate abuts the first annular surface of the first annular groove of the pin so that a seal is formed therebetween when a fluid is introduced into central bore through inlet bore.

16. The pin assembly of claim 10, wherein the pin is a drawn cup having a bottom wall that is contiguous with the side wall of the pin at its second end.

17. The pin assembly of claim 10, wherein the pin further comprises an annular ledge disposed in the central bore and a radially-inwardly depending annular flange disposed on the first end so that the first annular flange is disposed therebetween, wherein the annular flange holds the first plate in abutment with the annular ledge.

* * * * *